United States Patent
Spangler

(10) Patent No.: US 7,799,218 B2
(45) Date of Patent: Sep. 21, 2010

(54) PAINT RECLAMATION CLARIFIER SYSTEM

(75) Inventor: John M. Spangler, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 508 days.

(21) Appl. No.: 11/823,919

(22) Filed: Jun. 29, 2007

(65) Prior Publication Data
US 2009/0001026 A1 Jan. 1, 2009

(51) Int. Cl.
C02F 1/52 (2006.01)
C02F 103/14 (2006.01)

(52) U.S. Cl. .......... 210/167.3; 55/421; 55/DIG. 46; 96/237; 96/239; 210/195.1; 210/195.3; 210/202; 210/519; 210/521

(58) Field of Classification Search ............ 55/DIG. 46; 210/930
See application file for complete search history.

(56) References Cited

U.S. PATENT DOCUMENTS

| | | | |
|---|---|---|---|
| 4,722,791 A | 2/1988 | Turnquist | |
| 4,818,388 A * | 4/1989 | Morioka et al. | 210/167.31 |
| 4,948,513 A * | 8/1990 | Mitchell | 210/705 |
| 5,091,448 A | 2/1992 | Hostettler et al. | |
| 5,244,573 A | 9/1993 | Horisawa | |
| 5,490,939 A | 2/1996 | Gerigk et al. | |
| 5,605,636 A * | 2/1997 | Wyness | 210/801 |
| 5,684,053 A | 11/1997 | Spangler | |
| 5,702,516 A | 12/1997 | Spangler | |
| 6,146,530 A * | 11/2000 | Vollmer | 210/295 |
| 6,858,093 B2 | 2/2005 | Albu et al. | |
| 2003/0177902 A1 | 9/2003 | Spangler | |

FOREIGN PATENT DOCUMENTS

WO 9118679 12/1991

OTHER PUBLICATIONS

Database WPI Week 199043 Thomson Scientific, London, GB; AN 1990-324960, XP002496007 & JP 02233109 of Sep. 14, 1990.

* cited by examiner

*Primary Examiner*—Peter A Hruskoci
(74) *Attorney, Agent, or Firm*—Janda M. Carter; Leydig, Voit & Mayer

(57) ABSTRACT

A paint reclamation clarifier system in communication with a sump tank in a paint booth containing a carrier fluid for capturing paint droplets and a conduit for transporting the carrier fluid mixed with paint droplets to the reclamation clarifier system is presented. The clarifier system includes an influent port, a detackification agent inlet, a sludge tank in a lower portion of the clarifier for collecting the dispersed carrier liquid, where the paint droplets bond with the agent and settle to the bottom of the sludge tank, a sludge outlet, and, at least one effluent port located on or near an upper portion of a sidewall of the clarifier system permitting unsettled material to exit from the clarifier.

13 Claims, 2 Drawing Sheets

PAINT RECLAMATION CLARIFIER SYSTEM

TECHNICAL FIELD

This disclosure relates generally to a system and process for reclaiming paint overspray particles, and more particularly to a paint reclamation clarifier system and process for use.

BACKGROUND

Spray painting either by a robot or human operator generates a large amount of overspray waste. Overspray paint byproduct or paint waste generated in paint spraying operations takes the form of either a liquid sludge or semi-cured product embedded on a filter media. The term "overspray" means those coating components that miss the target substrate during spray application of the coating and in the absence of particular precautions are lost.

In the process of painting products, paint overspray and other chemicals are released into the atmosphere. If a paint booth is not properly maintained, it creates a health and safety hazard as well as an environmental hazard. There are two main methods for capturing these residual chemicals: dry filter scrubbers and water wash scrubbers.

The dry filter method involves capturing the overspray in filters by pulling the soil-laden air through the filter. As the filter captures the paints it also becomes chemically laden, and then must be disposed of properly. The major trend has been a movement toward dry filter booths; however, this ultimately creates more waste with the addition of the filters now being a waste product.

Water-wash paint booth systems capture oversprayed paint by using positive air pressure to force the particles into a cascading curtain of water. Various chemical and/or physical removal processes may be employed to remove the contaminants in the water. Theoretically, it is possible to recycle the water and the captured paint-by-product.

The water-wash design, because of its high efficiency and wet byproduct characteristics, has faced substantial challenges with the promulgation of more restrictive landfill regulations. It is becoming increasingly prohibitive, both economically and environmentally, to dispose of paint waste byproducts because of these regulations. Therefore, it is desirable to avoid the problem of disposal by recovering and recycling the overspray paint waste produced into a high quality paint product.

Paint is a tacky material and tends to coagulate and adhere to paint spray booth surfaces, particularly in sump and drain areas, and must constantly be removed from the sump to prevent clogging of the sump drain and recirculating system. In order to assist in the removal of the oversprayed paint from the air and to provide efficient operation of paint spray booths, detackifying agents are commonly employed in the water of such systems, and are typically incorporated into the water wash recirculated in the paint spray system. These agents may include, but are not limited to various fumed silicas. Detackifying the paint eliminates or minimizes the adhesive properties, or tackiness, of the paint, thereby preventing the oversprayed paint from adhering to the walls of the spray booth, etc.

The use of hydrophobic fumed silica (HFS) as a paint detackifier is known. This technology is efficient in detackifying overspray paint in some currently designed booths. For example, one approach to recovering paint overspray particles is described in U.S. Pat. No. 5,092,928 issued Mar. 3, 1992 to Spangler. This process includes bringing the paint particles into contact with a plurality of HFS by depositing a layer of HFS on the surface layer of the lower portion of the paint spray booth, then encapsulating and collecting the paint particles. This method has proven sufficient, however, due to the nature of the small, lightweight HFS particles, it is not a feasible material for many water wash booths. Additionally, there remains a need for a portable paint collection containment system, that may significantly reduce the amount of water required in the paint booth system, by re-using and reformulating the waste back into paint as well as reduce the Therefore, a device is needed to employ and utilize detackification agents effectively in current and newly designed booths. A system where detackification of the process water is almost immediate and is cheaper than the conventional polymer detackification employed in current paint booth systems, and that re-uses and reformulates the waste back into paint as well as reduces the solvent emissions.

SUMMARY OF THE INVENTION

One aspect of the present disclosure includes a paint reclamation clarifier system in communication with a sump tank in a paint booth containing a carrier fluid for capturing paint droplets and a conduit for transporting the carrier fluid mixed with paint droplets to the reclamation clarifier system. The clarifier system includes an influent port, a detackification agent inlet, a sludge tank in a lower portion of the clarifier for collecting the dispersed carrier liquid, where the paint droplets bond with the agent and settle to the bottom of the sludge tank, a sludge outlet, and, at least one effluent port located on or near an upper portion of a sidewall of the clarifier system permitting unsettled material to exit from the clarifier.

In another aspect of the present disclosure, method of reclamation and clarification of paint droplets from a carrier fluid comprising the steps of introducing a carrier fluid containing paint droplets from a sump tank of a paint booth into a mixing containment chamber of a paint reclamation clarifier system, adding a detackifying agent through a detackification inlet into the mixing containment chamber of the paint reclamation clarifier system, placing the carrier fluid containing paint droplets into rigorous contact with the detackifying agent within the mixing containment chamber, directing detackified paint sludge out of the paint reclamation clarifier through a sludge outlet, whereby the sludge is created when paint droplets from the carrier fluid bond with the detackifying agent and settle to the bottom of the sludge tank, and, directing unsettled material out of the clarifier through one or more effluent ports located on or near the sidewall of the clarifier.

DETAILED DESCRIPTION

Figure 1:
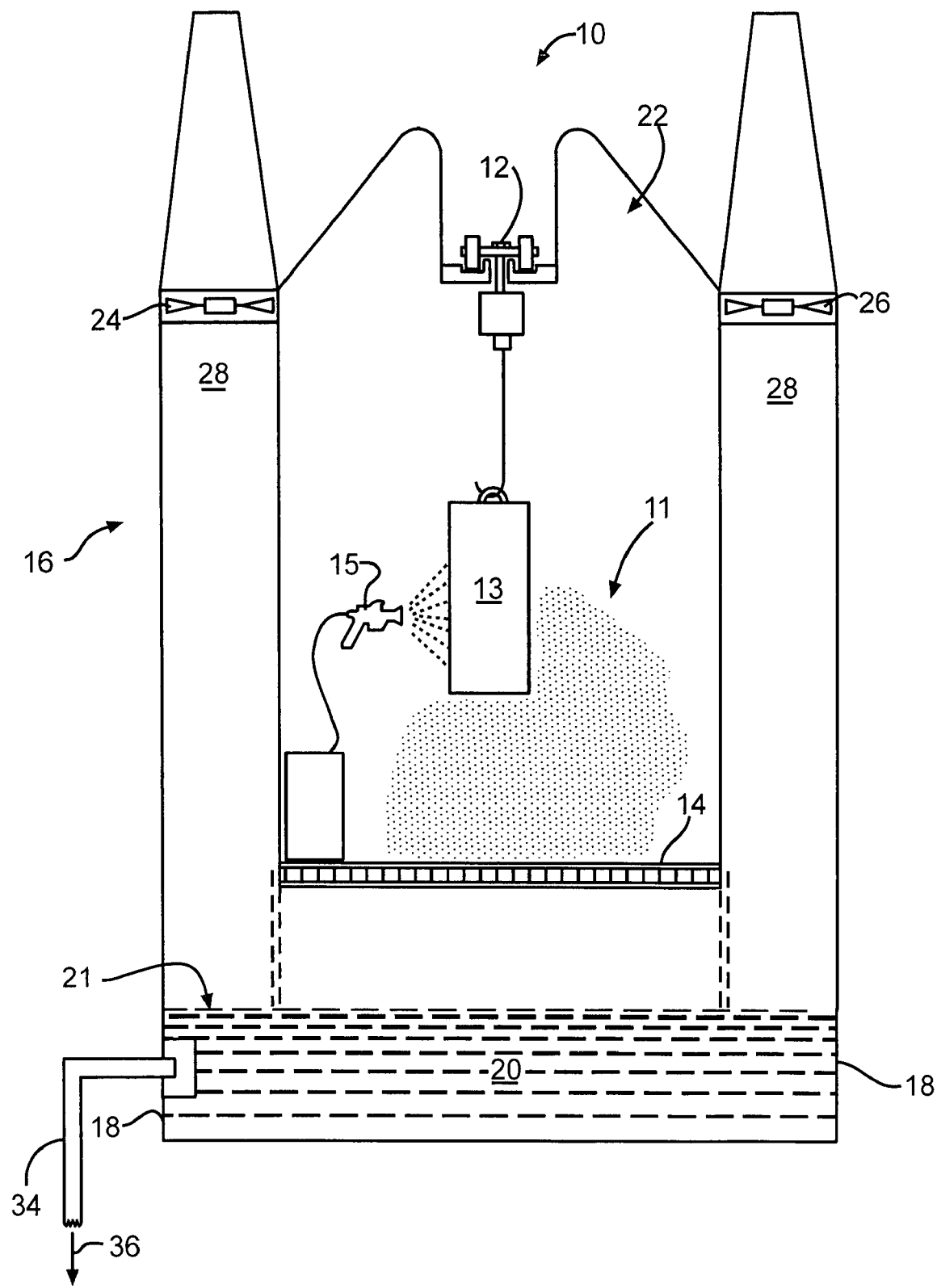
FIG. 1 is a sectional view of an illustrative water-wash paint spray booth.

A representative paint booth 10 suitable for carrying out an embodiment of the present disclosure is shown in FIG. 1. The paint booth 10 is adapted for use in industrial paint operations. The illustrated paint booth 10 is a conventional down draft, water wash type paint spray booth having a paint application station disposed in the paint booth 10 and includes one or more spray guns 15 or other automated painting devices connected to a source of paint (not shown), the operation of which may be controlled automatically, by robot or human operator. As illustrated in the drawing, an article 13 to be painted is transported through or placed in the paint booth 10 by conventional means, including conveyors, stands, mounting or suspending apparatus, or other means known to those skilled in the art.

The paint booth 10 has an open metal grate floor 14 or the like separating the paint booth 10 into an upper paint spray chamber 16 and a lower sump or sludge tank 18. The paint booth 10 also includes a supply of water or an aqueous bath 20 within the sludge tank 18. The aqueous bath 20 includes a top surface 21 separated by a prescribed distance from the grate floor 14.

Exhaust fans 24,26 are disposed in one or more exhaust air conduits 28 and are in flow communication with the paint booth 10. The exhaust fans 24,26 provide for the movement of air out of the paint booth 10. Flow of air into the paint booth is typically accomplished via make up air system. The make-up air system forcibly introduces a volume of air via a plenum (not shown) into the upper paint spray chamber 16, through the metal grate floor 14 to the sludge tank 18. The flow of air continues out one or more exhaust air conduits 28 via one or more exits or the like, that lead to exhaust air conduits and ultimately to the external environment. The exits are preferably disposed adjacent to the sludge tank 18 and proximate the top surface 21 of the aqueous bath 20.

As the air stream flows through the upper paint spray chamber 16 of paint booth 10, paint over-spray is entrained in the air stream. Such paint overspray particles or compounds are directed or transported with the flowing air stream from the upper paint spray chamber 16 of the paint booth 10 and through the open metal grate floor 14. After passing through the grate floor 14, the air stream containing the over-spray paint particles or droplets 11 is directed into sludge tank 18. Air stream flow volume through the paint booth 10 is preferably limited to about 50-100 cubic feet per second. Such a flow profile is sufficient to cause the over-spray paint particles and droplets carried by the air stream to fall from the air stream to the top surface 21 of the aqueous bath 20. Such velocity profile, however, does not substantially interfere in the painting operations. The optimum velocity of the air stream at which the over-spray paint particles or droplets 11 will most effectively gravitationally separate from the air stream is a function of the mass and size of the over-spray particles and droplets 11, which may be determined empirically for each industrial painting operation employing the above-described technology.

Figure 2:
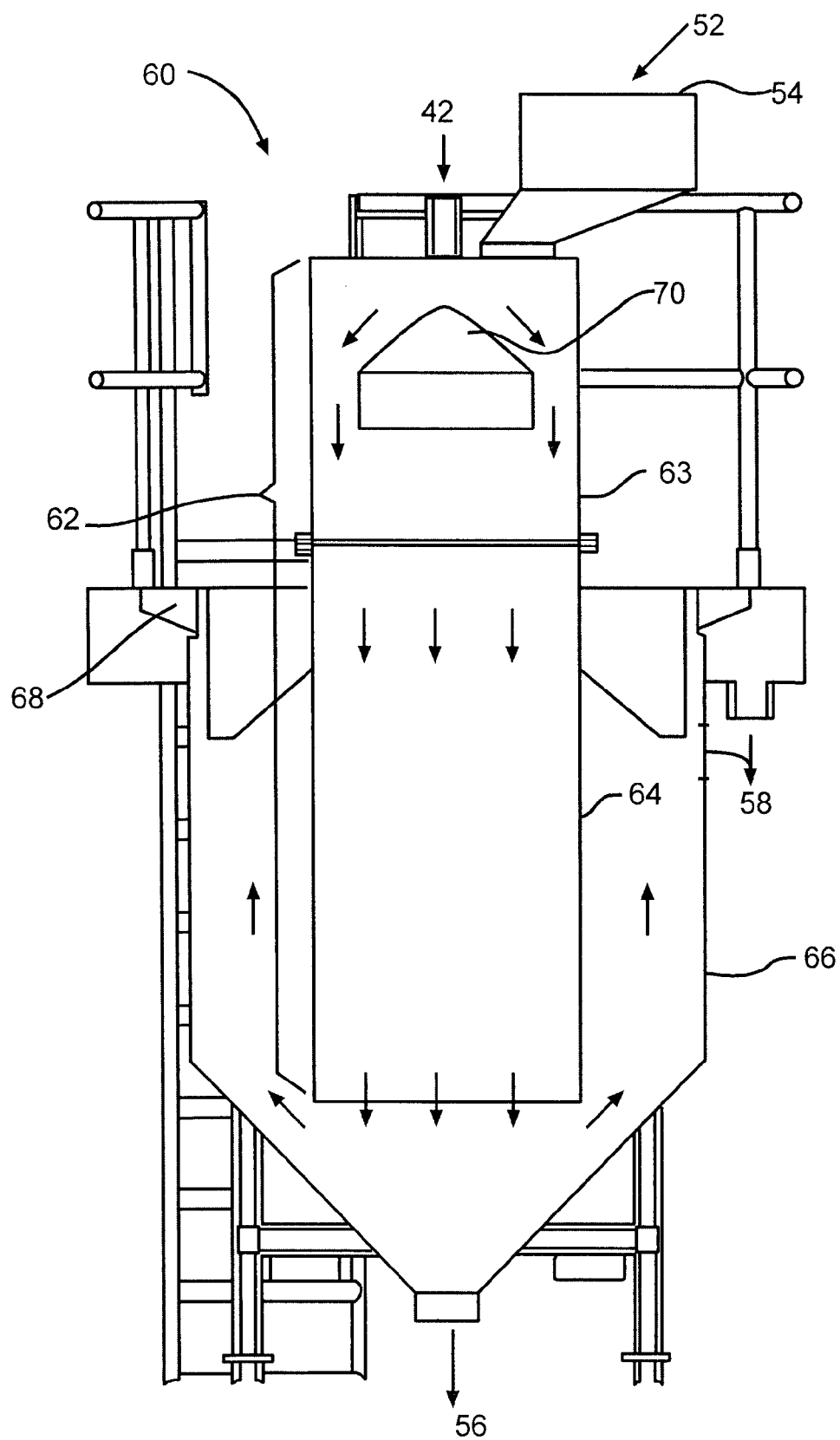
FIG. 2 is a sectional view of a paint reclamation clarifier system of the present disclosure.

Overspray paint particle laden wash water or aqueous bath sump fluid 20 is introduced to the paint reclamation mixing containment collection system or paint reclamation clarifier system 60 of FIG. 2 at the influent port 42 optionally via paint booth exit conduit 34. The influent port 42 may have a lid (not shown) (for example, screw-on, flip top, swivel). The paint reclamation clarifier system 60 also includes a detackifying agent inlet 52, at least one wash water outlet or effluent ports 58 located on or near a sidewall of the paint reclamation clarifier system 60, a sludge outlet 56, and a mixing containment chamber 62. The at least one effluent ports 58 may be aligned vertically at varying height levels along the side wall of the clarifier system 60 providing initial horizontally directed flow, or may be near yet outboard of the sidewall, with vertically directed flow, as would be understood by one skilled in the art.

A batch or continuous flow of powderous, gelatinous, or liquid detackification agent (not shown) is added to the mixing containment chamber at the detackification agent inlet 52. The detackification agent inlet 52 may be shaped as a hopper with a volumous area for conveniently allowing a user to pre-fill the detackification agent inlet 52 with detackification agent. The detackification agent inlet 52 may include a cover 54 which may be hingedly connected to the top of the detackification agent inlet 52.

The mixing containment chamber 62 includes an upper section 63 and a lower section 64. The paint reclamation clarifier system 60 may be cylindrical and generally shaped for gravitational fluid flow. The upper section 62 is closed at its upper end (except for the inlet areas). The lower portion 66 of the paint reclamation clarifier system 60 may have a larger overall volume than the mixing containment chamber 62, and the mixing containment chamber 62 may be partially contained within the lower portion 66 of the paint reclamation clarifier system 60. The upper end of the lower portion 66 is closed from the open atmosphere and operates to direct the effluent towards a weir 68. Decant valves associated with the plurality of effluent ports 58 may operate to allow directed material flow.

The weir 68 (along with a baffle system) located outside of the mixing containment chamber 62 provides the opportunity to re-introduce the detackification agent and or encapsulated process material that may be floating, back into the mixing containment area 62 via a pump system, or optionally may be siphoned off with a pumpless return. Additionally, the process material may be directed to a dewatering device (not shown), described further below.

Optionally, the process water or carrier fluid paint mixture 36 may be pumped into the mixing containment chamber 62. However, it may be possible to send process water through the containment chamber 62 either by gravity (this depends on the location of the clarifier) or by siphon. The system may optionally have two pumps if gravity or siphoning is not an option.

Within the upper section 63 of the mixing containment chamber 62, fluid at the influent port 42 and the detackification agent from the detackification agent inlet 52 are forced together through strong circulation currents. When the paint booth process water 36 is high velocity pumped into the mixing containment chamber 62, the paint droplets 11 come in forced contact with the detackification agent. Since the detackification agent is contained (with a closed and sealed top) 54, a rigorously strong washing effect occurs when the process water 36 is directed through the layer of detackification agent. As a result, the paint droplets 11 in the process water 36 become coated with detackification agent, within the mixing containment chamber 62. With continuous flow of process water 36 turbulently mixing through the detackification agent in the mixing containment chamber 62, the droplets 11 which are currently floating are continuously turned over and beat into the water beneath the layer of detackification agent within the containment chamber 62.

A mixing dispersion device 70 may optionally be located at the upper end of the upper section 60 of the mixing containment chamber 62. The mixing dispersion device 70 may operate to disperse the paint booth process water 36 as an influent (through conduit 34 or via a batch process) in an upper portion of the mixing chamber 62 into contact with a detackification agent. The device 70 may be of any shape or undergo any process action to facilitate the forced flow contact of the detackification agent into contact with the paint booth process water 36 from the influent port 42, such as by rotation, agitation, oscillation, vibration, or the like, or may undergo no movement at all. By way of example only, the mixing dispersion device 70 may be an inverted cone shape, a bowl shape, a two-or more headed tubular spout shape, or may be directly connected to the influent port 42 to facilitate further process water 36 flow.

Over a period of time, the solids begin to sink and the detackified paint sludge or treated fluid may exit from the paint reclamation clarifier system 60 at the sludge outlet 56. Depending on the flow rate and volume of material used, a portion of the detackification agent may be pushed beyond the central tubular mixing containment section 62, and may rise to the top of the surface, as well as the processed encapsulated sludge which may rise, remain suspended, or sink. The material that rises to the top of the surface may be re-introduced into the clarifier system 60 for additional treatment, or optionally into the paint booth lower sump tank 18, via the plurality of effluent ports 58. Additionally, this material that rises may be transported to a dewatering device (not shown). The material that is suspended will eventually settle over a period of time (likely less than 24 hours, or even within a few minutes given appropriate parameters). The treated material that sinks or remains suspended (at various levels of solids concentration) may be removed from the sludge outlet 56 at the bottom of the paint reclamation clarifier system 60. The settled paint sludge material may be sent to the clarifier 60, or to a dewatering device (not shown), or optionally back into the lower sump tank 18 of the paint booth 10. As is known, the dewatering device may be a filter, centrifuge, decanter, hydrocyclonic separator, filter press or the like.

Once collected, detackified paint droplets or sludge (and any of the aqueous solution collected therewith) is preferably transferred to a processing reservoir and optionally, conditioned with various materials to remove bacteria and otherwise aid in the recycling process. To remove the bacteria a biocide or other solution such as hydrogen peroxide is added to the processing reservoir to kill the bacteria. If necessary, the mixture (i.e. aqueous bath solution and detackified paint sludge) may then be transferred to a de-watering device for removal of the water. The remaining material may subsequently be dried to a moisture content of less than about 5 percent, and preferably a moisture content of less than about 2 percent. The dried, detackified, paint over-spray is then particulized to a size less than about 20 microns and dissolved in an appropriate solvent. The process for transferring, conditioning, de-watering, drying, and particulizing (e.g. milling) etc. are now well known to those persons skilled in the art.

In some higher volume processing situations, the carrier fluid/detackification agent mixture may be fed into a separator tank (not shown). The mixture in the tank may sit in the tank for a period of time for further separation. The upper portion of the mixture in the tank, or the detackification slurry, may be sent to the paint reclamation clarifier system 60. The lower portion of the mixture in the tank, or the effluent, may be sent back to the paint booth 10. The detackification slurry may intermittently be removed from the separator tank, at automatically set intervals, or at manually set times.

It will be understood that the paint reclamation clarifier system 60 can be of varying size and shape, but may, as an example, hold approximately 500 gallons of water and 2 cubic feet of detackification agent in one batch.

INDUSTRIAL APPLICABILITY

The preferred paint reclamation or paint recovery process is initiated with the detackification of the paint particles and droplets using the detackification agent. The encapsulated paint particles and droplets typically remain buoyant for a period of time, during which time the encapsulated paint particles and droplets can be removed and collected from paint reclamation clarifier system 60 via the sludge outlet 56 or other collection processes.

As indicated above, various materials can be added to the recycling materials (paint and silica) during the aforementioned process to aid the processing of the material as well as to complete the recycled paint product. In addition, specific additional ingredients such as binders, plasticizers, stabilizers, pigments, flow control agents, etc. can be included to restore properties to the recycled paint product that may have been lost during the original spraying operation.

It will be appreciated that the foregoing description provides examples of a paint reclamation clarifier and mixing chamber system. However, it is contemplated that other implementations of the disclosure may differ in detail from the foregoing examples, as would occur to those skilled in the art. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely, unless otherwise indicated.

Recitation of ranges of values or dimensions herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. Accordingly, this disclosure includes all modifications and equivalents of subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A paint reclamation clarifier system in communication with a sump tank in a paint booth containing a carrier fluid for capturing paint droplets and a conduit for transporting the carrier fluid mixed with paint droplets to the reclamation clarifier system, the clarifier system comprising:
   an influent port;
   a detackification agent inlet;
   a mixing containment chamber comprising an upper section in fluid communication with a lower section, the influent port and detackification agent inlet being in fluid communication with the upper section, whereby the carrier fluid mixed with paint droplets is mixed with the detackification agent to bind the saint droplets with the detackification agent, and flows into said lower section;
   a lower portion of the clarifier system for collecting the carrier fluid from the lower section, whereby the paint droplets bound with the agent settle to the bottom of the lower portion;
   a sludge outlet for outputting the paint droplets bound with the agent; and
   at least one effluent port located on or near an upper portion of a sidewall of the clarifier system for outputting clarified carrier fluid.

2. The paint reclamation clarifier system of claim 1, wherein decant valves operate to control flow from the at least one effluent port and the sludge outlet.

3. The paint reclamation clarifier system of claim 2, further comprising: a device for dispersing the carrier fluid/paint droplets mixture in the upper section into contact with the detackification agent at or adjacent to an upper end of the upper section of the system.

4. The paint reclamation clarifier system of claim 1, wherein the upper and lower sections are shaped for gravitational fluid flow.

5. The paint reclamation clarifier system of claim 1, wherein the at least one effluent port permits unsettled sludge or detackification agent to exit the system.

6. The paint reclamation clarifier system of claim 1, wherein unsettled material is reintroduced from the at least one effluent port back into the clarifier system.

7. The paint reclamation clarifier system of claim 1, wherein unsettled material is reintroduced from the at least one effluent port back into the paint booth sump tank.

8. The paint reclamation clarifier system of claim 1, wherein unsettled material is directed from the at least one effluent port into a dewatering device.

9. The paint reclamation clarifier system of claim 1, wherein sludge from the sludge outlet is directed to a dewatering device.

10. The paint reclamation clarifier system of claim 1, wherein sludge from the sludge outlet is reintroduced to the paint clarifier system.

11. The paint reclamation clarifier system of claim 1, wherein the influent port is adaptable to receive fluid in a batch process.

12. The paint reclamation clarifier system of claim 1, wherein the influent port is adaptable to receive the fluid in a continuous automated process.

13. An industrial painting system comprising:
a water wash paint booth including an upper paint spray chamber, a grate floor, a sump tank, and an air intake system having a stream of air;
an exhaust system including an exhaust air conduit and at least one exhaust fan, the exhaust system in flow communication with said air intake system;
a carrier fluid disposed in the sump tank for capturing paint droplets, a conduit for transporting the carrier fluid mixed with paint droplets to a reclamation clarifier system, the clarifier system having an influent port;
at least one effluent port located on or near an upper portion of a sidewall of the clarifier system;
a detackification agent inlet to the clarifier system a mixing containment chamber comprising an upper section in fluid communication with a lower section;
a device for dispersing the carrier fluid/paint droplets mixture as an influent in the upper section of the mixing containment chamber into contact with the detackification agent at or adjacent to the upper end of the upper section of the chamber wherein the mixture and agent flow into said lower section;
a sludge tank in a lower portion of the clarifier system for collecting the dispersed carrier fluid from the lower section, wherein the paint droplets bound with the agent settle to the bottom of the sludge tank;
a sludge outlet; and
a weir separating the dispersion device from the effluent port and having a lower edge below a bottom edge of the effluent port.

* * * * *